UNITED STATES PATENT OFFICE.

GEORGE PEACOCK INNES AND THOMAS CON ALLEN, OF SYDNEY, NEW SOUTH WALES, AUSTRALIA.

VARIABLE-SPEED AND REVERSIBLE GEAR.

No. 921,994.	Specification of Letters Patent.	Patented May 18, 1909.

Application filed May 18, 1908. Serial No. 433,508.

*To all whom it may concern:*

Be it known that we, GEORGE PEACOCK INNES and THOMAS CON ALLEN, subjects of the King of Great Britain and Ireland, residing, respectively, at 141 York street, Sydney, and at 163 King street, Sydney, both in the State of New South Wales, in the Commonwealth of Australia, have invented certain new and useful Improvements in Variable-Speed and Reversible Gear for Revolving Shafts, of which the following is a specification.

This invention relates to a gearing whereby the speed of a revolving shaft may be varied at will; the object of the invention being to accomplish this variation of speed without any sudden jerk or strain and without unnecessary loss of power.

For the purpose of clearness we will describe the invention as applied to the shaft of a motor car. On the free end of the engine shaft is keyed a wheel which gears with a number of pinion wheels which again gear with a similar number of pinion wheels of the same diameter, these latter also gear with a wheel of the same diameter as the wheel on the engine shaft. This latter wheel is keyed to a shaft (hereinafter called the driving shaft) which is in the same straight line as the engine shaft and is in juxtaposition to the wheel thereon. The spindles of the pinion wheels have bearings in the sides of a gear casing which incloses the whole of the gearing above mentioned. This gear casing has a bearing boss on both the engine and driving shafts and is adapted to revolve thereon. Keyed to each of the spindles of the piston wheels are eccentrics having eccentric rods connected to plungers in corresponding cylinders thus forming a series of pumps. These pumps are attached to the inside of the gear casing and are provided with inlet valves, and delivery pipes, the latter of which are placed outside of the gear casing, and are provided with valves before reëntering the gear casing, these valves are operated by a hand lever of any suitable construction. The casing is filled with oil through a suitable opening. But in order that the invention may be clearly understood reference will now be made to the accompanying sheet of drawings in which:—

Figure 1:
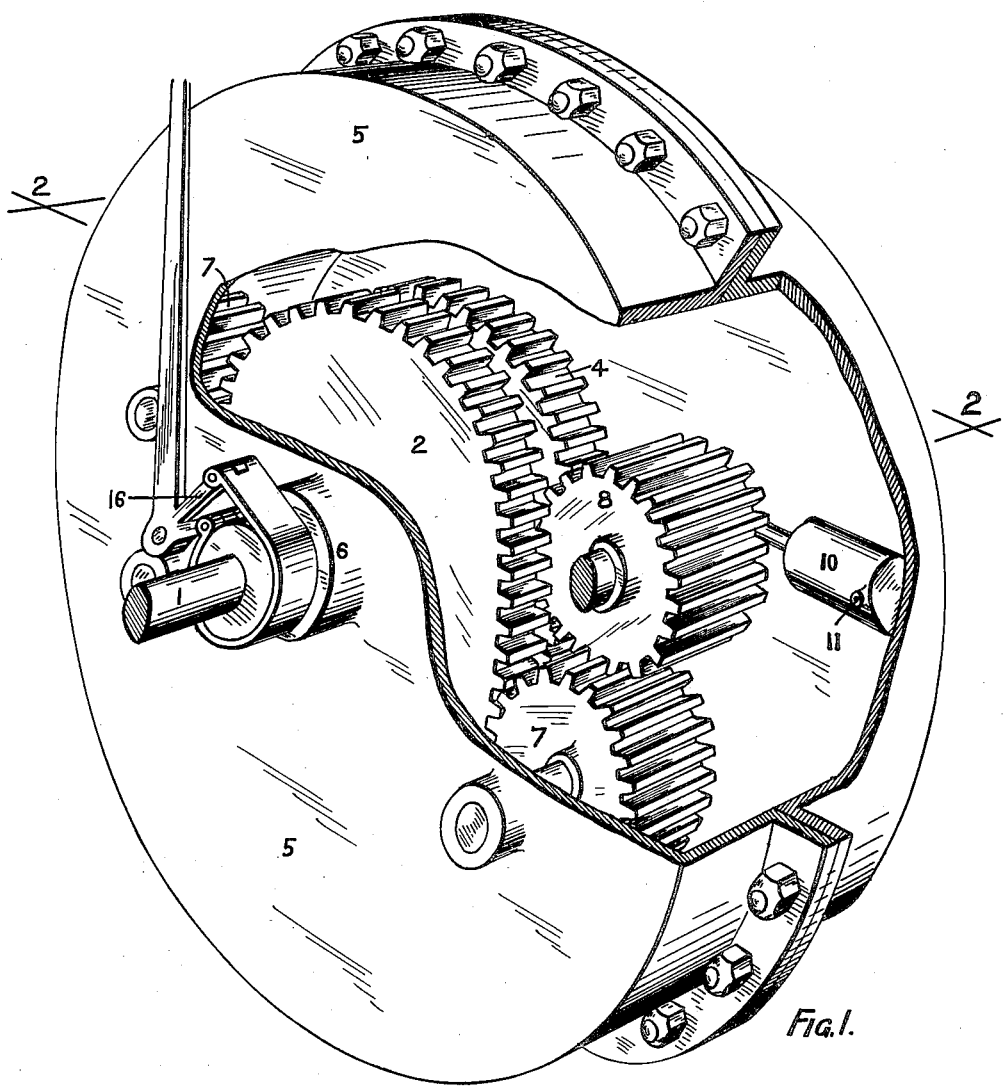
Figure 2:
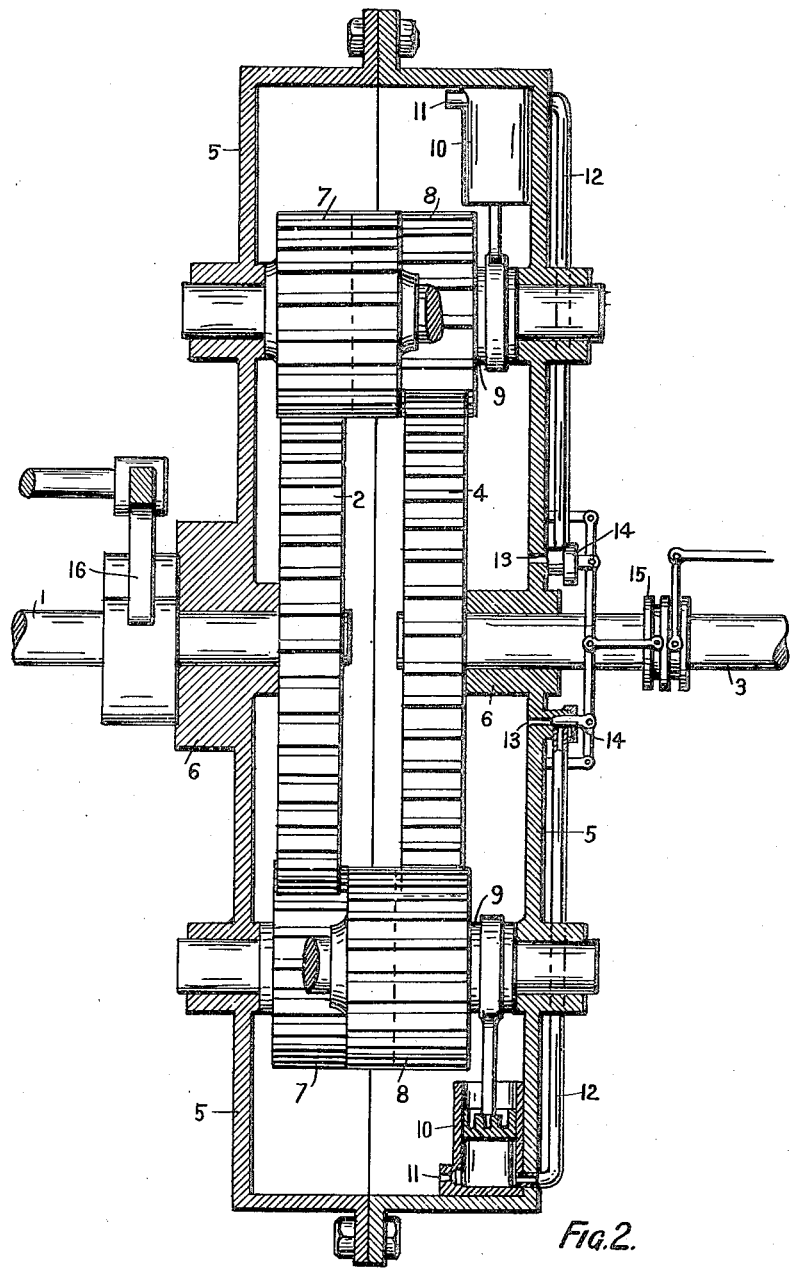

Figure 1 is a perspective view of the gearing as applied to a motor car. Fig. 2 is section on plane 2—2 Fig. 1.

1 is the engine shaft to which is keyed the sun-wheel 2.

3 is the driving shaft to which is keyed the sun-wheel 4.

5 is the gear casing having bearings 6 on the engine-shaft 1 and driving shaft 3 and being free to revolve thereon. This casing is made tight so as to retain the oil with which it is filled.

7, 7 are two of a series of planetary pinions having spindles and bearings in the walls of the casing 5. These pinions gear with the sun-wheel 2. 8, 8 are a corresponding series of planetary pinions which also have bearings in the walls of the casing 5 and gear with the sun-wheel 4 and also with the planetary pinions 7. On the spindles of the pinions 7 and 8 or on any number of them are small cranks or eccentrics 9 for operating the plungers of small circulating oil pumps 10 which are arranged around the inside periphery of the casing 5.

11 are inlet valves to pumps 10.

12 are delivery pipes which reënter the casing at 13. The delivery is controlled by adjustable valves 14. The valves 14 are operated by any well known mechanism such as that shown and marked 15.

16 is a band brake on the casing 5. This brake may be if desired applied to the outside periphery of the casing.

In operation the engine is started and allowed to run at its normal speed, the wheel on engine shaft giving motion to the pinions the pump valves being opened to their fullest extent, the plungers of the cylinders keeping the oil in circulation, by forcing it through the delivery pipes, the gear casing also revolving upon its bosses thereby allowing the wheel on driving shaft to remain stationary, but immediately the pump valves are partially closed the wheel on the driving shaft will be operatively engaged by the pinions and caused to revolve and the more the valves are closed down the greater becomes the speed of the driving shaft. When the valves are completely closed down thus preventing any circulation of oil, the smaller pinions become stationary, thus locking together the pinions on both engine and driving shafts, which causes the driving shaft to revolve at the same rate as the engine shaft.

In order to reverse the driving shaft, the gear casing is prevented or partially prevented from revolving on the shafts by means of a band brake on one of its bearing bosses, or on its outer periphery. This causes the wheel on the engine shaft to impart a reverse motion to the driving shaft.

The invention may be modified by using bevel gearing instead of spur gearing as above described.

We are aware that other attempts have been made to utilize a sun and planet gearing controlled by oil pumps for obtaining variable speeds, but the essential feature of our invention is the revolving casing carrying the planetary pinions, and the means of reversing the direction of the driving shaft.

What we claim and desire to secure by Letters Patent is:—

1. A variable speed gear comprising two axially alined and separated shafts, a spur wheel mounted on each shaft, a gear casing inclosing the spur wheels and mounted to revolve upon the shafts, two sets of planet wheels mounted in the gear casing the planet wheels of one set meshing with the planet wheels of the other set, one set of planet wheels meshing with one of the spur wheels and the other set of planet wheels meshing with the other spur wheel, and pumps secured within the gear casing operated by one of the sets of planet wheels during their planetary revolution.

2. A variable speed gear comprising two axially alined and separated shafts, a spur wheel mounted on each shaft, a gear casing inclosing the spur wheels and mounted to revolve upon the shafts, two sets of planet wheels mounted in the gear casing the planet wheels of one set meshing with the planet wheels of the other set, one set of planet wheels meshing with one of the spur wheels and the other set of planet wheels meshing with the other spur wheel, pumps secured to and having inlets within the gear casing, pump rods operated by the planet wheels, delivery pipes for the pumps exterior to the gear casing and reëntering the gear casing near its center, valves controlling the delivery pipes, and an operating mechanism for the controlling valves operable from one of the shafts during the revolution of the gear casing.

3. A variable speed gear comprising two axially alined and separated shafts, a spur wheel mounted on each shaft, a gear casing inclosing the spur wheels and mounted to revolve upon the shafts, two sets of planet wheels mounted in the gear casing the planet wheels of one set meshing with the planet wheels of the other set, one set of planet wheels meshing with one of the spur wheels and the other set of planet wheels meshing with the other spur wheel, and a band brake engaging the gear casing.

Signed at Sydney, New South Wales, this 24th day of March 1908.

GEORGE PEACOCK INNES.
THOMAS CON ALLEN.

Witnesses:
WILLIAM NEWTON,
WALTER SIGMONT.